(12) United States Patent
Kawasaki

(10) Patent No.: US 8,089,529 B2
(45) Date of Patent: Jan. 3, 2012

(54) IMAGE PICK UP DEVICE

(75) Inventor: Toshiyuki Kawasaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 361 days.

(21) Appl. No.: 12/320,822

(22) Filed: Feb. 5, 2009

(65) Prior Publication Data

US 2009/0207276 A1 Aug. 20, 2009

(30) Foreign Application Priority Data

Feb. 14, 2008 (JP) ................................. 2008-033586

(51) Int. Cl.
*H04N 5/225* (2006.01)
*H04N 5/228* (2006.01)
*H04N 9/73* (2006.01)
*H04N 5/217* (2011.01)

(52) U.S. Cl. .................. 348/224.1; 348/148; 348/216.1; 348/222.1; 348/241

(58) Field of Classification Search .................. 348/148, 348/216.1, 222.1, 224.1, 229.1, 241, 248, 348/252

See application file for complete search history.

(56) References Cited

U.S. PATENT DOCUMENTS

| 7,031,071 B2 * | 4/2006 | Nishioka | 359/676 |
| 2002/0008760 A1 * | 1/2002 | Nakamura | 348/222 |

FOREIGN PATENT DOCUMENTS

| EP | 0 804 021 | | 10/1997 |
|---|---|---|---|
| JP | 2007-194775 | | 0/2007 |
| JP | 06-086064 A | * | 3/1994 |
| JP | 7-99575 | | 4/1995 |
| JP | 10-327321 | | 12/1998 |
| JP | 2003-69829 | | 3/2003 |
| JP | 2005-260640 | | 9/2005 |
| JP | 2005-303595 | | 10/2005 |
| JP | 2006-246080 | | 9/2006 |
| JP | 2006-345054 | | 12/2006 |
| KR | 2007-0070822 | | 7/2007 |

OTHER PUBLICATIONS

English Machine translation of JP 06-086064 to Nishimura published Mar. 25, 1994.*
Chinese Office Action dated Aug. 3, 2010 issued in corresponding Chinese Application No. 200910004899.3.

* cited by examiner

*Primary Examiner* — Daniel M Pasiewicz
(74) *Attorney, Agent, or Firm* — Harness, Dickey & Pierce, P.L.C

(57) ABSTRACT

An image pickup device includes an optical system; an image sensor; an AGC circuit; an image processing unit configured to perform at least an MTF correction process; and a control unit configured to control the image processing unit so as not to perform the MTF correction process in the event that the control unit determines that illuminance is low based on information which directly or indirectly indicates the illuminance.

12 Claims, 4 Drawing Sheets

G SIGNAL

R SIGNAL

B SIGNAL

FIG.4

| 0 | −0.5 | 0 | −0.5 | 0 |
|---|---|---|---|---|
| −0.5 | 0 | −1.0 | 0 | −0.5 |
| 0 | −1.0 | 9.0 | −1.0 | 0 |
| −0.5 | 0 | −1.0 | 0 | −0.5 |
| 0 | −0.5 | 0 | −0.5 | 0 |

FIR FILTER

IMAGE PICK UP DEVICE

BACKGROUND OF THE INVENTION

1. Field of the Invention

The present invention relates to image pickup devices, and more particularly to an image pickup device that is suitable as an in-vehicle camera.

2. Description of the Related Art

In recent years and continuing, there are growing demands for wide-angle image pickup devices as in-vehicle cameras, which are used as back monitors of vehicles. However, in a conventional image pickup device, processes such as magnification chromatic aberration, skew correction, distortion correction, and MTF correction are univocally performed on the image data acquired by an image sensor (see, for example, patent document 1).

Patent Document 1: Japanese Laid-Open Patent Application No. 2006-345054

When an image pickup device is used in a dim place, it is difficult to achieve a bright monitor image. By increasing the gain when the illuminance is low, a bright monitor image can be achieved. However, noise would be noticeable in the image, thus decreasing the image quality.

SUMMARY OF THE INVENTION

The present invention provides an image pickup device in which one or more of the above-described disadvantages are eliminated.

A preferred embodiment of the present invention provides an image pickup device with which noise is unnoticeable in the monitor image even if the gain is increased when the illuminance is low.

According to an aspect of the present invention, there is provided an image pickup device including an optical system; an image sensor; an AGC circuit; an image processing unit configured to perform at least an MTF correction process; and a control unit configured to control the image processing unit so as not to perform the MTF correction process in the event that the control unit determines that illuminance is low based on information which directly or indirectly indicates the illuminance.

According to one embodiment of the present invention, an image pickup device is provided, with which noise is unnoticeable in the monitor image even if the gain is increased when the illuminance is low, and the sensitivity can be increased by increasing the gain, so that a bright monitor image can be achieved.

BRIEF DESCRIPTION OF THE DRAWINGS

Other objects, features and advantages of the present invention will become more apparent from the following detailed description when read in conjunction with the accompanying drawings, in which:

FIG. 4 illustrates an example of an FIR filter.

DETAILED DESCRIPTION OF THE PREFERRED EMBODIMENTS

A description is given, with reference to the accompanying drawings, of embodiments of the present invention.

The present embodiment describes an image pickup device for taking an image of a subject with the use of an optical system having large magnification chromatic aberration and large skew aberration at a wide field angle. In the present embodiment, an image processing system is configured to perform magnification chromatic aberration correction and skew aberration correction, although the image processing system is not so limited. Furthermore, the color components of the images are the three primary colors of red (R), green (G), and blue (B). The color components may be the three subtractive primary colors of yellow (Y), magenta (M), and cyan (C).

Figure 1:
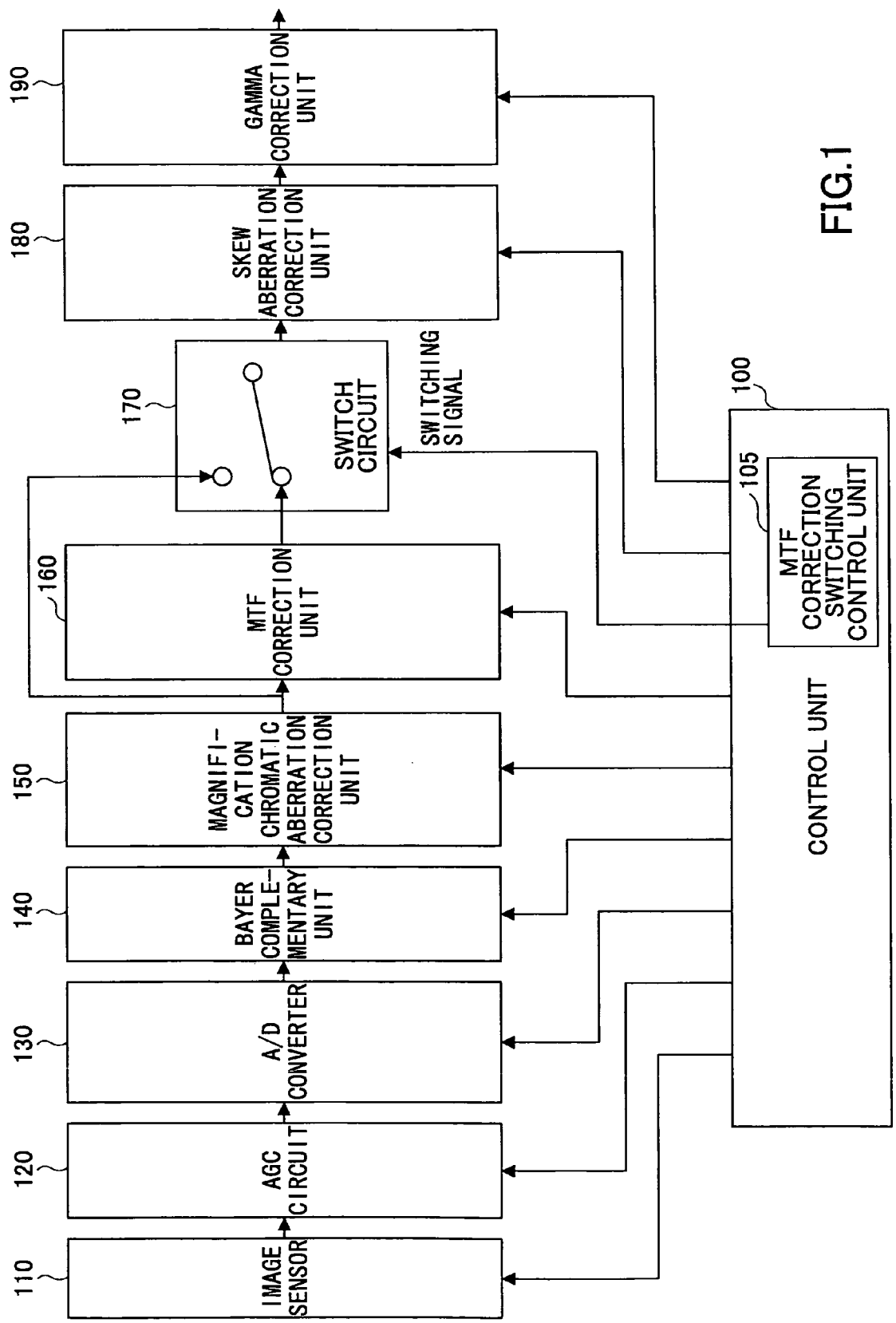
FIG. 1 is a functional block diagram of an image processing system in an image pickup device according to an embodiment of the present invention.

FIG. 1 is a functional block diagram of an example of an image processing system in an image pickup device to which an embodiment of the present invention is applied. The image pickup device also includes an operations unit, an image display unit (monitor), an optical system, and mechanical mechanisms for controlling the shutter speed and adjusting the diaphragm of the lens, although not shown in FIG. 1. The image pickup device is assumed to be used as an in-vehicle camera, although the purpose of the image pickup device is not so limited.

In FIG. 1, a control unit 100 controls the operations of the units in the image pickup device in a pipeline-like manner by providing necessary control signals (clocks, horizontal/vertical synchronization signals, etc.) to the units in the image pickup device. The control unit 100 includes an MTF correction switching control unit 105, which is described below. The MTF correction switching control unit 105 can be provided separately from the control unit 100.

An image sensor 110 is, for example, a CCD or a CMOS sensor for converting an optical image, which has been taken with the use of an optical system (not shown) having large magnification chromatic aberration and large skew aberration at a wide angle, into electric signals (image signals). The image sensor 110 is provided with a color filter of the Bayer array. RGB image data of the Bayer array is sequentially output by a progressive method based on control signals (clocks, horizontal/vertical synchronization signals, etc.) received from the control unit 100.

An AGC circuit 120 amplifies images signals that are analog signals output from the image sensor 110, to predetermined values. Generally, the gain amount of the AGC circuit 120 is determined to be a suitable value in consideration of the trade-off between the demanded brightness of the screen and noise.

An A/D converter 130 converts RGB image signals of the Bayer array which are the analog signals amplified at the AGC circuit 120, into digital signals (image data), and sends the resultant digital signals to a Bayer complementary unit 140. The image data includes eight bits of data for each of R, G, and B, for example.

The Bayer complementary unit 140 receives RGB image data of the Bayer array which has been converted into digital signals. The Bayer complementary unit 140 performs linear complementation so that image data for all coordinate positions is separately generated for each of the colors of RGB. Then, the Bayer complementary unit 140 sends the image data to a magnification chromatic aberration correction unit 150.

Figure 2A:
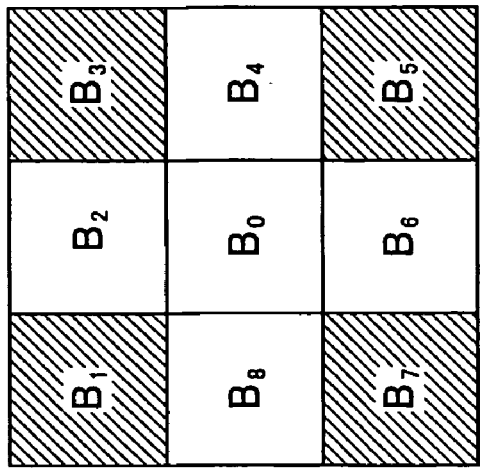
FIGS. 2A through 2C illustrate color filters of the Bayer array.
Figure 2B:
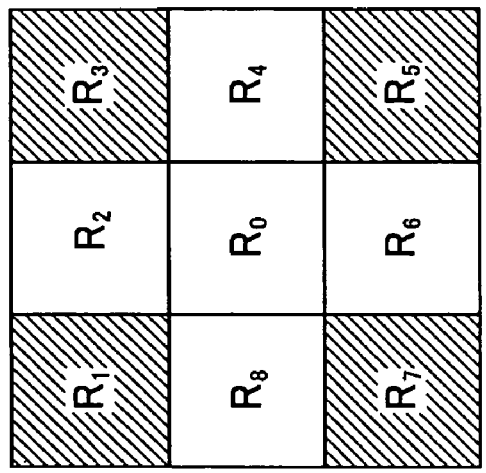
Figure 2C:
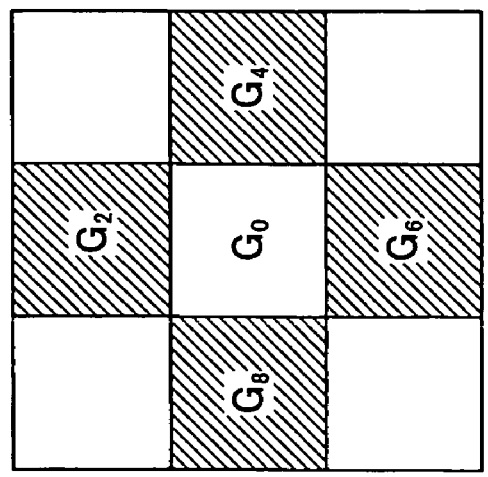

FIGS. 2A through 2C illustrate color filters of the Bayer array. $G_0$ is obtained by the following formula.

$$G_0=(G_2+G_4+G_6+G_8)/4 \quad (1)$$

Furthermore, $R_2$, $R_4$, $R_6$, $R_8$, $R_0$ are obtained by the following formulae.

$$R_2=(R_1+R_3)/2 \quad (2)$$

$$R_4=(R_3+R_5)/2 \quad (3)$$

$$R_6=(R_5+R_7)/2 \quad (4)$$

$$R_8=(R_1+R_7)/2 \quad (5)$$

$$R_0=(R_1+R_3+R_5+R_7)/4 \quad (6)$$

The method for obtaining $B_2$, $B_4$, $B_6$, $B_8$, $B_0$ is the same as that used for $R_2$, $R_4$, $R_6$, $R_8$, $R_0$, and is thus not further described.

In the present embodiment, a description is given of an image sensor having a color filter of the Bayer array. However, the same effects can be achieved with an image sensor having a color filter of another array such as a CMYG array or an RGB+Ir (infrared) array. Such an image sensor having a color filter array of four colors is more effective than an image sensor having a color filter array of three colors like RGB, because a memory of low latency or a four port RAM would be required for the magnification chromatic aberration correction.

The magnification chromatic aberration correction unit 150 receives the RGB image data which has undergone Bayer complementation. At the magnification chromatic aberration correction unit 150, coordinate conversion (magnification chromatic aberration coordinate conversion) is separately performed for each of the color components of R, G, and B with the use of a predetermined polynomial equation. The magnification chromatic aberration correction unit 150 outputs the RGB image data that has undergone magnification chromatic aberration correction. Magnification chromatic aberration is different for each of the color components, but the extent of aberration is small. Thus, for the coordinate conversion in magnification chromatic aberration correction, a memory having low capacity and low latency or a memory having low capacity and plural ports (SRAM, etc.) can be used. An MTF correction unit 160 and the output side of the magnification chromatic aberration correction unit 150 are connected to a switch circuit 170.

The MTF correction unit 160 receives the RGB image data that has undergone magnification chromatic aberration correction. At the MTF correction unit 160, an MTF correction process is performed on the RGB image data with the use of an FIR filter. The MTF correction unit 160 outputs the RGB image data which has undergone MTF correction.

Figure 3:
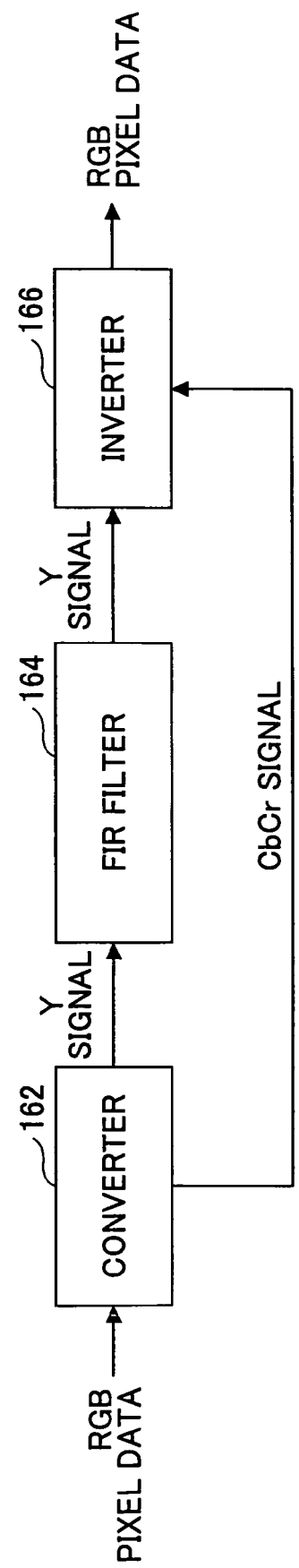
FIG. 3 is a schematic diagram of an MTF correction unit according to an embodiment of the present invention.

FIG. 3 is a schematic diagram of the MTF correction unit 160. A converter 162 converts the RGB image data into YCbCr pixel data by the following formulae.

$$Y=0.299R+0.587G+0.114B \quad (7)$$

$$Cr=0.500R-0.419G-0.081B \quad (8)$$

$$Cb=-0.169R-0.332G+0.500B \quad (9)$$

An FIR filter (5×5 filter) 164 receives only the Y luminance signals among the YCbCr signals, and performs a predetermined MTF correction process on the Y luminance signals. FIG. 4 illustrates an example of the FIR filter. By performing the filtering (MTF correction) only on the Y signals, it is possible to achieve high-quality images in which amplification of color noise is mitigated. Filtering is performed for Y signals, and therefore the MTF correction needs to be performed after magnification chromatic aberration correction. However, if MTF correction were performed after skew aberration correction which is described below, calculation errors would tend to occur, because the conversion length of the coordinate conversion is long in the skew aberration correction. This error would be amplified by performing the MTF correction, which would have an adverse impact on the image quality. To avoid such a situation, the MTF correction unit is preferably provided at a stage after the magnification chromatic aberration correction and before the skew aberration correction.

An inverter 166 receives the CbCr signals and the Y signals that have undergone MTF correction, inverts these signals by the following formulae, and outputs the RGB image data.

$$R=Y+1.402Cr \quad (10)$$

$$G=Y-0.714Cr-0.344Cb \quad (11)$$

$$B=Y+1.772Cb \quad (12)$$

The switch circuit 170 is usually connected to the MTF correction unit 160 to receive the RGB image data that has undergone MTF correction from the MTF correction unit 160, and to output this RGB image data to a skew aberration correction unit 180 provided at a subsequent stage. However, when the switch circuit 170 receives a signal for switching off the MTF correction from the MTF correction switching control unit 105 of the control unit 100, the switch circuit 170 is disconnected from the MTF correction unit 160 and is connected to the magnification chromatic aberration correction unit 150. In this case, the switch circuit 170 receives the RGB image data from the magnification chromatic aberration correction unit 150 and directly outputs this RGB image data to the skew aberration correction unit 180.

The skew aberration correction unit 180 receives the RGB image data that has undergone MTF correction from the MTF correction unit 160, or the RGB image data that has not undergone MTF correction from the magnification chromatic aberration correction unit 150. The skew aberration correction unit 180 performs the same coordinate conversion (skew aberration coordinate conversion) on each of the color components of RGB with the use of a predetermined polynomial equation, and outputs the RGB image data that has undergone skew aberration correction. The skew aberration is larger than the magnification chromatic aberration; however, the extent of skew aberration is the same for all of the color components of RGB. For this reason, for the coordinate conversion of skew aberration correction, it is possible to use a memory (DRAM, etc.) which has a larger capacity than that for magnification chromatic aberration correction (corresponding to a maximum of one screen), but which has high latency because only a single port will suffice. Incidentally, the magnification chromatic aberration and the skew aberration can be corrected simultaneously.

A gamma correction unit 190 receives the RGB image data output from the skew aberration correction unit 180, performs a predetermined gamma correction process with the use of look-up tables provided for each of RGB, and outputs the RGB image data that has undergone gamma correction to a display device (not shown).

The above describes the overall operation of the image pickup device shown in FIG. 1 according to an embodiment of the present invention. The following describes the MTF correction switching control unit 105 which is the main element of an embodiment of the present invention.

When the MTF correction switching control unit 105 of the control unit 100 determines that the illuminance is low based on information directly or indirectly indicating the illuminance of the surrounding atmosphere, the MTF correction switching control unit 105 sends a switching signal for turning off the MTF correction to the switch circuit 170. When this signal is received, the switch circuit 170 bypasses the MTF correction unit 160. Accordingly, when the illuminance is low, MTF correction is not performed, thus reducing the noise in the reproduced image. Furthermore, when the MTF correction switching control unit 105 sends a switching signal for turning off the MTF correction to the switch circuit 170, the gain of the AGC circuit 120 is increased at the same time. Accordingly, the sensitivity of the reproduced image is increased.

The MTF correction switching control unit 105 determines whether the illuminance is low by the following methods. These are merely some examples; any method or means may be used as long as it can be determined whether the illuminance is low.

(i) The MTF correction switching control unit 105 acquires the output of the image sensor 110, and calculates the illuminance based on the sum of the brightness levels of the entire screen, or in some cases based on the sum of the brightness levels which is weighted for a certain subject in the center of the screen. The MTF correction switching control unit 105 determines whether the illuminance is low by comparing the calculated illuminance with a threshold. For example, when the average light amount of the entire screen is less than or equal to 10 lx, or when the light amount at the center of the screen is less than or equal to 10 lx, the illuminance is determined as being low.

(ii) By controlling the shutter speed and adjusting the diaphragm of the lens, an image with the desired illuminance can be achieved. Thus, the illuminance is determined based on the shutter speed and the diaphragm of the lens.

(iii) The illuminance is indirectly determined based on the time indicated by a built-in clock in the device. For example, the illuminance is determined as being low after 5 pm and before 5 am, although this may vary depending on the season.

(iv) When the image pickup device is used as an in-vehicle camera, it is determined that the illuminance is low when the small lights or the tail lights are switched on.

(v) A separate illuminance sensor is provided, and the value output from this illuminance sensor is compared with a threshold to determine whether the illuminance is low.

The reason why noise becomes noticeable when the gain is increased is because the high-pass (high frequency region) is raised. If the high-pass were decreased, the noise would be unnoticeable. In order to decrease the high-pass, MTF correction should not be performed.

According to an embodiment of the present invention, in the event that it is determined that the illuminance is low according to information which directly or indirectly indicates the illuminance, an MTF correction process is not performed. The illuminance is determined based on an output value from an image sensor, an output value from an illuminance sensor provided separately, the time indicated by a built-in clock, or whether small lights or tail lights are switched on.

The present invention is not limited to the specifically disclosed embodiment, and variations and modifications may be made without departing from the scope of the present invention.

The present application is based on Japanese Priority Patent Application No. 2008-033586, filed on Feb. 14, 2008, the entire contents of which are hereby incorporated herein by reference.

What is claimed is:

1. An image pickup device comprising:
an optical system;
an image sensor;
an AGC circuit;
a magnification chromatic aberration correction unit configured to perform magnification chromatic aberration correction on image data;
an MTF correction unit configured to perform an MTF correction process on an output of the magnification chromatic aberration correction unit;
a skew aberration correction unit configured to perform skew aberration correction on an output of the magnification chromatic aberration correction unit or the MTF correction unit;
a control unit configured to control the MTF correction unit so as not to perform the MTF correction process in the event that the control unit determines that illuminance of the image data is low based on information which directly or indirectly indicates the illuminance; and
a switch circuit configured to provide a first connection between the MTF correction unit and the skew aberration correction unit or a second connection between the magnification chromatic aberration correction unit and the skew aberration correction unit, the second connection bypassing the MTF correction unit,
the switch circuit configured to receive a signal for switching off the MTF correction unit from the control unit and to transfer the output of the magnification chromatic aberration correction unit to the skew aberration correction unit via the second connection.

2. The image pickup device according to claim 1, wherein:
the control unit determines whether the illuminance is low based on an output value from the image sensor.

3. The image pickup device according to claim 1, wherein:
the control unit determines whether the illuminance is low based on an output value from an illuminance sensor provided separately.

4. The image pickup device according to claim 1, wherein:
the control unit determines whether the illuminance is low based on time.

5. The image pickup device according to claim 1, wherein:
the control unit determines whether the illuminance is low based on whether a lamp is turned on.

6. The image pickup device according to claim 1, wherein:
the control unit further increases the gain of the AGC circuit in the event that the illuminance is determined as being low.

7. The image pickup device according to claim 2, wherein:
the control unit further increases the gain of the AGC circuit in the event that the illuminance is determined as being low.

8. The image pickup device according to claim 3, wherein:
the control unit further increases the gain of the AGC circuit in the event that the illuminance is determined as being low.

9. The image pickup device according to claim 4, wherein:
the control unit further increases the gain of the AGC circuit in the event that the illuminance is determined as being low.

10. The image pickup device according to claim 5, wherein:
the control unit further increases the gain of the AGC circuit in the event that the illuminance is determined as being low.

11. The image pickup device according to claim 1, wherein the control unit determines whether the illuminance is low based on a time indicated by a built-in clock.

12. The image pickup device according to claim 1, wherein the control unit determines whether the illuminance is low when at least one light or tail light of a vehicle is switched on.

* * * * *